United States Patent
Cherpeck

Patent Number: 6,039,773
Date of Patent: Mar. 21, 2000

[54] FUEL COMPOSITIONS CONTAINING POLYAMINES OF POLYALKYL AROMATIC ESTERS

[75] Inventor: Richard E. Cherpeck, Cotati, Calif.

[73] Assignee: Chevron Chemical Company LLC, San Francisco, Calif.

[21] Appl. No.: 08/995,596

[22] Filed: Dec. 22, 1997

[51] Int. Cl.[7] .................. C10L 1/18; C10L 1/22
[52] U.S. Cl. ............... 44/399; 560/19; 560/43; 560/64
[58] Field of Search ............... 44/399; 560/19, 560/43, 64

[56] References Cited

U.S. PATENT DOCUMENTS

| | | | |
|---|---|---|---|
| 2,714,607 | 8/1955 | Matter | 260/471 |
| 3,149,933 | 9/1964 | Ley et al. | 44/75 |
| 3,285,855 | 11/1966 | Dexter et al. | 252/57 |
| 3,434,814 | 3/1969 | Dubeck et al. | 44/69 |
| 3,849,085 | 11/1974 | Kreuz et al. | 44/78 |
| 4,134,846 | 1/1979 | Machleder et al. | 252/51.5 A |
| 4,231,759 | 11/1980 | Udelhofen et al. | 44/75 |
| 4,320,020 | 3/1982 | Lange | 252/51.5 R |
| 4,320,021 | 3/1982 | Lange | 252/51.5 R |
| 4,328,322 | 5/1982 | Baron | 521/163 |
| 4,347,148 | 8/1982 | Davis | 252/51.5 R |
| 4,386,939 | 6/1983 | Lange | 44/63 |
| 4,859,210 | 8/1989 | Franz et al. | 44/53 |
| 5,090,914 | 2/1992 | Reardan et al. | 435/188 |
| 5,196,142 | 3/1993 | Mollet et al. | 252/311 |
| 5,196,595 | 3/1993 | Ross | 560/55 |
| 5,211,721 | 5/1993 | Sung et al. | 44/389 |
| 5,380,345 | 1/1995 | Cherpeck | 44/399 |
| 5,407,452 | 4/1995 | Cherpeck | 44/399 |
| 5,628,803 | 5/1997 | Cherpeck | 44/399 |
| 5,667,539 | 9/1997 | Jackson et al. | 44/399 |

*Primary Examiner*—Jacqueline V. Howard
*Attorney, Agent, or Firm*—Claude J. Caroli

[57] ABSTRACT

A polyamine-containing polyalkyl aromatic ester having the formula:

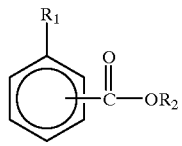

or a fuel-soluble salt thereof;

wherein $R_1$ is a polyamine moiety having about 2 to about 12 amine nitrogen atoms and about 2 to about 40 carbon atoms, wherein the polyamine moiety is connected to the aromatic ring through one of its amine nitrogen atoms and $R_2$ is a polyalkyl group having an average molecular weight in the range of about 450 to 5000.

The polyamine-containing polyalkyl aromatic esters of the present invention are useful as fuel additives for the prevention and control of engine deposits.

28 Claims, No Drawings

FUEL COMPOSITIONS CONTAINING POLYAMINES OF POLYALKYL AROMATIC ESTERS

BACKGROUND OF THE INVENTION

1. Field of the Invention

This invention relates to polyamines of polyalkyl aromatic esters and to fuel compositions containing polyamines of polyalkyl aromatic esters. More particularly, this invention relates to polyalkyl aromatic esters having a polyamine moiety on the aromatic ring and to the use of such compounds in fuel compositions to prevent and control engine deposits.

2. Description of the Related Art

It is well known that automobile engines tend to form deposits on the surface of engine components, such as carburetor ports, throttle bodies, fuel injectors, intake ports and intake valves, due to the oxidation and polymerization of hydrocarbon fuel. These deposits, even when present in relatively minor amounts, often cause noticeable driveability problems, such as stalling and poor acceleration. Moreover, engine deposits can significantly increase an automobile's fuel consumption and production of exhaust pollutants. Therefore, the development of effective fuel detergents or "deposit control" additives to prevent or control such deposits is of considerable importance and numerous such materials are known in the art.

For example, aliphatic hydrocarbon-substituted phenols are known to reduce engine deposits when used in fuel compositions. U.S. Pat. No. 3,849,085, issued Nov. 19, 1974 to Kreuz et al., discloses a motor fuel composition comprising a mixture of hydrocarbons in the gasoline boiling range containing about 0.01 to 0.25 volume percent of a high molecular weight aliphatic hydrocarbon-substituted phenol in which the aliphatic hydrocarbon radical has an average molecular weight in the range of about 500 to 3,500. This patent teaches that gasoline compositions containing minor amounts of an aliphatic hydrocarbon-substituted phenol not only prevent or inhibit the formation of intake valve and port deposits in a gasoline engine, but also enhance the performance of the fuel composition in engines designed to operate at higher operating temperatures with a minimum of decomposition and deposit formation in the manifold of the engine.

Similarly, U.S. Pat. No. 4,134,846, issued Jan. 16, 1979 to Machieder et al., discloses a fuel additive composition comprising a mixture of (1) the reaction product of an aliphatic hydrocarbon-substituted phenol, epichlorohydrin and a primary or secondary mono- or polyamine, and (2) a polyalkylene phenol. This patent teaches that such compositions show excellent carburetor, induction system and combustion chamber detergency and, in addition, provide effective rust inhibition when used in hydrocarbon fuels at low concentrations.

Amino phenols are also known to function as detergentsldispersants, antioxidants and anti-orrosion agents when used in fuel compositions. U.S. Pat. No. 4,320,021, issued Mar. 16, 1982 to R. M. Lange, for example, discloses amino phenols having at least one substantially saturated hydrocarbon-based substituent of at least 30 carbon atoms. The amino phenols of this patent are taught to impart useful and desirable properties to oil-based lubricants and normally liquid fuels. Similar amino phenols are disclosed in related U.S. Pat. No. 4,320,020, issued Mar. 16, 1982 to R. M. Lange.

Similarly, U.S. Pat. No. 3,149,933, issued Sep. 22, 1964 to K Ley et al., discloses hydrocarbon-substituted amino phenols as stabilizers for liquid fuels.

U.S. Pat. No. 4,386,939, issued Jun. 7, 1983 to R. M. Lange, discloses nitrogen-containing compositions prepared by reacting an amino phenol with at least one 3- or 4-membered ring heterocyclic compound in which the hetero atom is a single oxygen, sulfur or nitrogen atom, such as ethylene oxide. The nitrogen-containing compositions of this patent are taught to be useful as additives for lubricants and fuels.

Nitro phenols have also been employed as fuel additives. For example, U.S. Pat. No. 4,347,148, issued Aug. 31, 1982 to K E. Davis, discloses nitro phenols containing at least one aliphatic substituent having at least about 40 carbon atoms. The nitro phenols of this patent are taught to be useful as detergents, dispersants, antioxidants and demulsifiers for lubricating oil and fuel compositions.

Similarly, U.S. Pat. No. 3,434,814, issued Mar. 25, 1969 to M. Dubeck et al., discloses a liquid hydrocarbon fuel composition containing a major quantity of a liquid hydrocarbon of the gasoline boiling range and a minor amount sufficient to reduce exhaust emissions and engine deposits of an aromatic nitro compound having an alkyl, aryl, aralkyl, alkanoyloxy, alkoxy, hydroxy or halogen substituent.

More recently, certain poly(oxyalkylene) esters have been shown to reduce engine deposits when used in fuel compositions. U.S. Pat. No. 5,211,721, issued May 18, 1993 to R. L. Sung et al., for example, discloses an oil soluble polyether additive comprising the reaction product of a polyether polyol with an acid represented by the formula RCOOH in which R is a hydrocarbyl radical having 6 to 27 carbon atoms. The poly(oxyalkylene) ester compounds of this patent are taught to be useful for inhibiting carbonaceous deposit formation, motor fuel hazing, and as ORI inhibitors when employed as soluble additives in motor fuel compositions.

Poly(oxyalkylene) esters of amino- and nitrobenzoic acids are also known in the art. For example, U.S. Pat. No. 2,714,607, issued Aug. 2, 1955 to M. Matter, discloses polyethoxy esters of aminobenzoic acids, nitrobenzoic acids and other isocyclic acids. These polyethoxy esters are taught to have excellent pharmacological properties and to be useful as anesthetics, spasmolytics, analeptics and bacteriostatics.

Similarly, U.S. Pat. No. 5,090,914, issued Feb. 25, 1992 to D. T. Reardan et al., discloses poly(oxyalkylene) aromatic compounds having an amino or hydrazinocarbonyl substituent on the aromatic moiety and an ester, amide, carbamate, urea or ether linking group between the aromatic moiety and the poly(oxyalkylene) moiety. These compounds are taught to be useful for modifying macromolecular species such as proteins and enzymes.

U.S. Pat. No. 4,328,322, issued Sep. 22, 1980 to R. C. Baron, discloses amino- and nitrobenzoate esters of oligomeric polyols, such as poly(ethylene) glycol. These materials are used in the production of synthetic polymers by reaction with a polyisocyanate.

In addition, U.S. Pat. No. 4,231,759, issued Nov. 4, 1980 to Udelhofen et al., discloses a fuel additive composition comprising the Mannich condensation product of (1) a high molecular weight alkyl-substituted hydroxyaromatic compound wherein the alkyl group has a number average molecular weight of about 600 to about 3,000, (2) an amine, and (3) an aldehyde. This patent teaches that such Mannich condensation products provide carburetor cleanliness when employed alone, and intake valve cleanliness when employed in combination with a hydrocarbon carrier fluid.

U.S. Pat. No. 4,859,210, issued Aug. 22, 1989 to Franz et al., discloses fuel compositions containing (1) one or more polybutyl or polyisobutyl alcohols wherein the polybutyl or polyisobutyl group has a number average molecular weight of 324 to 3,000, or (2) a poly(alkoxylate) of the polybutyl or polyisobutyl alcohol, or (3) a carboxylate ester of the polybutyl or polyisobutyl alcohol. This patent further teaches that when the fuel composition contains an ester of a polybutyl or polyisobutyl alcohol, the ester-forming acid group may be derived from saturated or unsaturated, aliphatic or aromatic, acyclic or cyclic mono- or polycarboxylic acids.

U.S. Pat. No. 3,285,855, issued Nov. 15, 1966 to Dexter et al., discloses alkyl esters of dialkyl hydroxybenzoic and hydroxyphenylalkanoic acids wherein the ester moiety contains from 6 to 30 carbon atoms. This patent teaches that such esters are useful for stabilizing polypropylene and other organic material normally subject to oxidative deterioration. Similar alkyl esters containing hindered dialkyl hydroxyphenyl groups are disclosed in U.S. Pat. No. 5,196,565, which issued Mar. 23, 1993 to Ross.

U.S. Pat. No. 5,196,142, issued Mar. 23, 1993 to Mollet et al., discloses alkyl esters of hydroxyphenyl carboxylic acids wherein the ester moiety may contain up to 23 carbon atoms. This patent teaches that such compounds are useful as antioxidants for stabilizing emulsion-polymerized polymers.

U.S. Pat. No. 5,380,345, issued Jan. 10, 1995 to Cherpeck et al., discloses polyalkyl aromatic esters containing a nitro, amino, N-alkylamino, or N,N-dialkylamino moiety on the aromatic ring. Compounds described were useful as fuel additives for the prevention and control of engine deposits.

It has now been discovered that polyalkyl aromatic esters having a polyamine moiety on the aromatic ring are surprisingly useful for reducing engine deposits, especially intake valve deposits, when employed as fuel additives in fuel compositions.

SUMMARY OF THE INVENTION

The present invention provides novel polyamine-containing polyalkyl aromatic ester compounds having the following formula and fuel-soluble salts thereof:

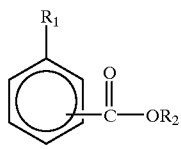

(I)

wherein $R_1$ is a polyamine moiety having about 2 to about 12 amine nitrogen atoms and about 2 to about 40 carbon atoms, wherein the polyamine moiety is connected to the aromatic ring through one of its amine nitrogen atoms; and $R_2$ is a polyalkyl group having an average molecular weight in the range of about 450 to 5,000.

The present invention also provides a fuel composition comprising a major amount of hydrocarbons boiling in the gasoline or diesel range and an effective deposit-controlling amount of a polyamine-containing polyalkyl aromatic ester of Formula I above.

The present invention further provides a fuel concentrate comprising an inert stable oleophilic organic solvent boiling in the range of from about 150° F. (about 65° C.) to about 400° F. (205° C.) and from about 10 to about 70 weight percent of a polyamine-containing polyalkyl aromatic ester of Formula I above.

Among other factors, the present invention is based on the discovery that polyalkyl aromatic esters having a polyamine moiety on the aromatic ring are surprisingly useful for reducing engine deposits, especially on intake valves, when employed as fuel additives in fuel compositions.

DETAILED DESCRIPTION OF THE INVENTION

The compounds provided by the present invention are polyamine-containing polyalkyl aromatic esters having the general formula:

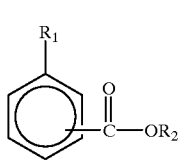

(I)

wherein $R_1$ and $R_2$ are as defined above.

In Formula I, $R_1$ is a polyamine moiety having about 2 to about 12 amine nitrogen atoms and about 2 to about 40 carbon atoms, wherein the polyamine moiety is connected to the aromatic ring through one of its amine nitrogen atoms. More preferably, $R_1$ is a polyamine moiety derived from a polyalkylene polyamine containing about 2 to about 12 nitrogen atoms and about 2 to about 24 carbon atoms. Still more preferably, $R_1$ is a polyamine moiety derived from a polyalkylene polyamine having the formula:

 $H_2N-(R_3NH)_x-H$ (II)

wherein $R_3$ is an alkylene group having about 2 to about 6 carbon atoms and x is an integer from 1 to about 4. Most preferably $R_1$ is a polyamine moiety derived from ethylenediamine or diethylenetriamine.

Preferably, $R_2$ is a polyalkyl group having an average molecular weight in the range of about 500 to 5,000, more preferably about 500 to 3,000, and most preferably about 600 to 2,000. A particularly preferred polyallyl group has an average molecular weight of about 700 to 2,000, and especially about 900 to 1,500.

A preferred group of polyamine-containing polyalkyl aromatic esters of this invention are compounds of Formula I wherein $R_1$ is derived from ethylenediamine or diethylenetriamine and $R_2$ is a polyalkyl group having an average molecular weight of about 500 to 5,000.

A more preferred group of polyamine-containing polyalkyl aromatic esters are those of Formula I wherein $R_1$ is derived from ethylenediamine or diethylenetriamine and $R_2$ is a polyalkyl group having an average molecular weight of about 500 to 3,000.

A particularly preferred group of polyamine containing polyalkyl aromatic esters are those of Formula I wherein $R_1$ is derived from ethylenediamine and $R_2$ is a polyalkyl group having an average molecular weight of about 600 to 2,000.

It is especially preferred that the polyamine group present in the aromatic ring of the polyalkyl aromatic esters of this invention be situated in a para position relative to the polyalkyl ester moiety.

The polyamine-containing polyalkyl aromatic esters of the present invention will generally have a sufficient molecular weight so as to be non-volatile at normal engine intake valve operating temperatures (about 200 to about 250° C.). Typically, the molecular weight of the polyalkyl aromatic esters will range from about 600 to about 10,000, preferably from about 1,000 to about 3,000, more preferably from about 700 to about 2,000.

Fuel-soluble salts of the polyamine-containing polyalkyl aromatic esters employed in the present invention can be readily prepared for those compounds containing a polyamine group and such salts are contemplated to be useful for preventing or controlling engine deposits. Suitable salts include, for example, those obtained by protonating the amino moiety with a strong organic acid, such as an alkyl- or arylsulfonic acid. Preferred salts are derived from toluenesulfonic acid and methanesulfonic acid.

Definitions

As used herein the following terms have the following meanings unless expressly stated to the contrary.

The term "amino" refers to the group: —$NH_2$.

The term "alkyl" refers to both straight- and branched-chain alkyl groups.

The term "lower alkyl" refers to alkyl groups having 1 to about 6 carbon atoms and includes primary, secondary and tertiary alkyl groups. Typical lower alkyl groups include, for example, methyl, ethyl, n-propyl, isopropyl, n-butyl, sec-butyl, t-butyl, n-pentyl, n-hexyl and the like.

The term "lower alkoxy" refers to the group —$OR_a$ wherein $R_a$ is lower alky. Typical lower alkoxy groups include methoxy, ethoxy, and the like.

The term "polyalkyl" refers to an alkyl group which is generally derived from polyolefins which are polymers or copolymers of mono-olefins, particularly 1-mono-olefins, such as ethylene, propylene, butylene, and the like. Preferably, the mono-olefin employed will have 2 to about 24 carbon atoms, and more preferably, about 3 to 12 carbon atoms. More preferred mono-olefins include propylene, butylene, particularly isobutylene, 1-octene and 1-decene. Polyolefins prepared from such mono-olefins include polypropylene, polybutene, especially polyisobutene, and the polyalphaolefins produced from 1-octene and 1-decene.

The term "fuel" or "hydrocarbon fuel" refers to normally liquid hydrocarbons having boiling points in the range of gasoline and diesel fuels.

General Synthetic Procedures

The polyamine-cntaining polyalkyl aromatic esters of this invention can be prepared by the following general methods and procedures. Those skilled in the art will recognize that where typical or preferred process conditions (e.g. reaction temperatures, times, mole ratios of reactants, solvents, pressures, etc.) are given, other process conditions may also be used unless otherwise stated. Optimum reaction conditions may vary with the particular reactants or solvents used, but one skilled in the art will be able to determine such conditions by routine optimization procedures.

Moreover, those skilled in the art will recognize that it may be necessary to block or protect certain functional groups while conducting the following synthetic procedures. In such cases, the protecting group will serve to protect the functional group from undesired reactions or to block its undesired reaction with other functional groups or with the reagents used to carry out the desired chemical transformations. The proper choice of a protecting group for a particular functional group will be readily apparent to one skilled in the art. In the present synthetic procedures, a hydroxyl group will preferably be protected, when necessary, as the benzyl or tert-butyldimethylsilyl ether. Various protecting groups and their introduction and removal are described, for example, in T. W. Greene and P. G. M. Wuts, "*Protective Groups in Organic Synthesis*", Second Edition, Wiley, New York, 1991, and references cited therein.

The polyamine-containing polyalkyl aromatic esters of the present invention having the formula:

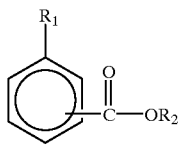

(I)

wherein $R_1$ and $R_2$ are as defined above, may be prepared by first esterifying an aromatic carboxylic acid having the formula:

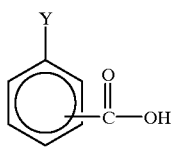

(III)

wherein Y is a halogen, preferably fluorine, or nitro, with a polyalkyl alcohol having the formula:

(IV)

wherein $R_2$ is as defined above, using conventional esterification reaction conditions.

The resulting compound will have the formula below:

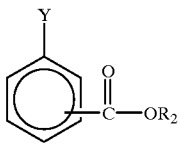

(V)

wherein Y and $R_2$ are as defined above.

The aromatic carboxylic acids of Formula III are either known compounds or can be prepared from known compounds by conventional procedures.

The polyalkyl alcohols of Formula IV may also be prepared by conventional procedures known in the art. Such procedures are taught, for example, in U.S. Pat. Nos. 5,055,607 to Buckley and 4,859,210 to Franz et al., the disclosures of which are incorporated herein by reference.

In general, the polyalkyl substituent on the polyalkyl alcohols of Formula IV and the resulting polyalkyl aromatic esters of the present invention will have an average molecular weight in the range of about 450 to about 5,000, preferably about 500 to about 5,000, more preferably about 500 to about 3,000, and most preferably about 600 to about 2,000. A particularly preferred polyalkyl substituent has an average molecular weight of about 700 to 2,000, especially from about 900 to 1,500.

The polyalkyl substituent on the polyalkyl alcohols employed in the invention may be generally derived from polyolefins which are polymers or copolymers of mono-olefins, particularly 1-mono-olefins, such as ethylene, propylene, butylene, and the like. Preferably, the mono-olefin employed will have about 2 to about 24 carbon atoms, and more preferably, about 3 to about 12 carbon atoms. More preferred mono-olefins include propylene, butylene, particularly isobutylene, 1-octene and 1-decene. Polyolefins prepared from such mono-olefins include polypropylene, polybutene, especially polyisobutene, and the polyalphaolefins produced from 1-octene and 1-decene.

The preferred polyisobutene used to prepare the presently employed polyalkyl alcohols are polyisobutene which comprise at least about 20% of the more reactive methylvinylidene isomer, preferably at least 50% and more preferably at least 70%. Suitable polyisobutene include those prepared using $BF_3$ catalysts.

The preparation of such polyisobutene in which the methylvinylidene isomer comprises a high percentage of the total composition is described in U.S. Pat. Nos. 4,152,499 and 4,605,808. Such polyisobutene, known as "reactive" polyisobutene, yield high molecular weight alcohols in which the hydroxyl group is at or near the end of the hydrocarbon chain.

Examples of suitable polyisobutene having a high alkylvinylidene content include Ultravis 30, a polyisobutene having a molecular weight of about 1,300 and a methylvinylidene content of about 74%, and Ultravis 10, a polyisobutene having a molecular weight of about 950 and a methylvinylidene content of about 76%, both available from British Petroleum.

The polyalkyl alcohols may be prepared from the corresponding olefins by conventional procedures. Such procedures include hydration of the double bond to give an alcohol. Suitable procedures for preparing such long-chain alcohols are described in 1. T. Harrison and S. Harrison, "Compendium of Organic Synthetic Methods", Wiley-Interscience, New York (1971), pp. 119–122, as well as in U.S. Pat. Nos. 5,055,607 and 4,859,210.

As indicated above, the polyalkyl aromatic esters of Formula I may be prepared by esterifying an aromatic carboxylic acid of Formula III with a polyalkyl alcohol of Formula IV under conventional esterification reaction conditions.

Typically, this reaction will be conducted by contacting a polyalkyl alcohol of Formula IV with about 0.25 to about 1.5 molar equivalents of an aromatic carboxylic acid of Formula III in the presence of an acidic catalyst at a temperature in the range of about 70° C. to about 160° C. for about 0.5 to about 48 hours. Suitable acid catalysts for this reaction include p-toluenesulfonic acid, methanesulfonic acid and the like. The reaction may be conducted in the presence or absence of an inert solvent, such as benzene, toluene and the like. The water generated by this reaction is preferably removed during the course of the reaction by, for example, azeotropic distillation with an inert solvent, such as toluene.

Alternatively, the polyalkyl aromatic esters of Formula I may be prepared by reacting a polyalkyl alcohol of Formula IV with an acid halide derived from an aromatic carboxylic acid of Formula III, such as an acid chloride or acid bromide.

Generally, the carboxylic acid moiety of Formula III may be converted into an acyl halide moiety by contacting a compound of Formula III with an inorganic acid halide, such as thionyl chloride, phosphorous trichloride, phosphorous tribromide, or phosphorous pentachloride; or with oxalyl chloride. Typically, this reaction will be conducted using 1 to about 5 molar equivalents of the inorganic acid halide or oxalyl chloride, either neat or in an inert solvent, such as diethyl ether, at a temperature in the range of about 20° C. to about 80° C. for about 1 to about 48 hours. A catalyst, such as N,N-dimethylformamide, may also be used in this reaction.

Reaction of the acid halide derived from Formula III with a polyalkyl alcohol of Formula IV provides a polyalkyl aromatic ester of Formula V. Typically, this reaction is conducted by contacting Formula V with about 0.9 to about 1.5 molar equivalents of the acid halide in an inert solvent, such as toluene, dichloromethane, diethyl ether, and the like, at a temperature in the range of about 25° C. to about 150° C. The reaction is generally complete in about 0.5 to about 48 hours. Preferably, the reaction is conducted in the presence of a sufficient amount of an amine capable of neutralizing the acid generated during the reaction, such as triethylamine, di(isopropyl)ethylamine, pyridine or 4-dimethylaminopyridine.

The aromatic carboxylic acids of Formula III employed in the above-described procedures are either known compounds or can be prepared from known compounds by conventional procedures. Representative aromatic carboxylic acids suitable for use in these reactions include, but are not limited to, for example, 2-bromo-, 2-chloro-, 2-iodo-, 2-fluoro-, or 2-nitrobenzoic acid, or 4-bromo, 4-chloro-, 4-iodo, 4-fluoro-, or 4-nitrobenzoic acid. Preferably, the aromatic carboxylic acid is 4-fluorobenzoic acid.

As indicated above, the polyalkyl aromatic esters of the present invention contain a polyamine moiety wherein the polyamine is connected to the aromatic ring through one of its amine nitrogen atoms which is covalently linked to the aforementioned polyalkyl aromatic ester.

The polyamine component of the polyamine-containing polyalkyl aromatic esters of this invention is preferably derived from a polyamine containing about 2 to about 12 amine nitrogen atoms and from about 2 to about 40 carbon atoms. Polyamines having a carbon-to-nitrogen ratio of from 1:1 to about 10:1 are particularly preferred.

In preparing the compounds of this invention using a polyamine where the various nitrogen atoms of the polyamine are not geometrically equivalent, several substitutional isomers are possible and each of these possible isomers is encompassed within this invention.

Suitable polyamines can have a straight- or branched-chain structure and may be cyclic or acyclic or combinations thereof. Generally, the amine nitrogen atoms of such polyamines will be separated from one another by at least two carbon atoms, i.e. polyamines having an animal structure are not suitable. The polyamine may also contain one or more oxygen atoms, typically present as an ether or a hydroxyl group.

A particularly preferred group of polyamines for use in the present invention are polyalkylene polyamines, including alkylene diamines. Such polyalkylene polyamines will typically contain about 2 to about 12 nitrogen atoms and about 2 to about 24 carbon atoms. Preferably, the alkylene groups of such polyalkylene polyamines will contain from about 2 to about 6 carbon atoms, more preferably from about 2 to about 4 carbon atoms.

Examples of suitable polyalkylene polyamines include ethylenediamine, propylenediamine, isopropylenediamine, butylenediamine, pentylenediamine, hexylenediamine, diethylenetriamine, dipropylenetriamine, diisopropylenetriamine, dibutylenetriamine, di-sec-butylenetriamine, triethylenetetraamine, tripropylenetetraamine, triisobutylenetetraamine, tetraethylenepentamine, pentaethylenehexamine, dimethylaminopropylamine and mixtures thereof.

Particularly suitable polyalkylene polyamines are those having the formula:

$H_2N-(R_3NH)_x-H$ wherein $R_3$ is a straight- or branched-chain atkylene group having about 2 to about 6 carbon atoms, preferably about 2 to about 4 carbon atoms, most preferably about 2 carbon atoms, i.e. ethylene (—$H_2CH_2$—); and x is an integer from 1 to about 4, preferably 1 or about 2.

Particularly preferred polyalkylene polyamines are ethylenediamine, diethylenetriamine, triethylenetetraamine and tetraethylenepentamine. Most preferred are ethylenediamine and diethylenetriamine, especially ethylenediamine.

Also contemplated for use in the present invention are cyclic polyamines having one or more 5- to 6-membered rings. Such cyclic polyamines compounds include piperazine, 2-methylpiperazine, N-2-aminoethyl)piperazine, N-(2-hydroxyethyl)piperazine, 1,2-bis-(N-piperazinyl) ethane, 3-aminopyrrolidine, N-(2-aminoethyl)pyrrolidine and the like. Among the cyclic polyamines, the piperazines are preferred.

Many of the polyamines suitable for use in the present invention are commercially available and others many be prepared by methods which are well known in the art. For example, methods for preparing amines and their reactions are detailed in Sidgewick's "*The Organic Chemistry of Nitrogen*", Clarendon Press, Oxford, 1966; Noller's "*Chemistry of Organic Compounds*", Saunders, Philadelphia, 2nd Ed., 1957; and Kirk-Othmees "*Encyclopedia of Chemical Technology*", 2nd Ed., especially Volume 2, pp. 99–16.

The polyamine-containing polyalkyl aromatic esters of the present invention can then be achieved by reacting a polyalkyl aromatic ester of Formula V with a suitable polyamine, such as the polyamine of Formula II above.

The reaction of the compounds of Formulas V and II will be apparent to those skilled in the art. Typically, such reaction may be conducted by aromatic nucleophilic substitution reactions with amines have been reviewed by J. F. Bunnett and R. E. Zahler, "*Chemical Reviews*", 49, 273–319 (1951). Typically, such reactions may be conducted by contacting a compound of Formula V with 1 to about 25 equivalents of the polyamine of Formula II in an inert solvent such as toluene or chloroform or in the absence of solvent at a temperature range of about 25° C. to about 175° C. for about 0.5 to about 48 hours. The reaction can be conducted in the presence of a tertiary amine capable of neutralizing the acid generated during the reaction such as triethylamine or diisopropylethylamine or by employing excess of the polyamine. Typically, excess polyamine is employed to minimize any bis aromatic polyamines.

Fuel Compositions

The polyamine-containing polyalkyl aromatic esters of the present invention are useful as additives in hydrocarbon fuels to prevent and control engine deposits, particularly intake valve deposits. Typically, the desired deposit control is achieved by operating an internal combustion engine with a fuel composition containing a polyamine-containing polyalkyl aromatic ester of the present invention. The proper concentration of additive necessary to achieve the desired level of deposit control varies depending upon the type of fuel employed, the type of engine, and the presence of other fuel additives.

In general, the concentration of the polyamine-containing polyalkyl aromatic esters of this invention in hydrocarbon fuel will range from about 50 to about 2,500 parts per million (ppm) by weight, preferably from about 75 to about 1,000 ppm. When other deposit control additives are present, a lesser amount of the present additive may be used.

The polyamine-containing polyalkyl aromatic esters of the present invention may also be formulated as a concentrate using an inert stable oleophilic (i.e., dissolves in gasoline) organic solvent boiling in the range of about 150° F. to about 400° F. (about 650° C. to about 205° C.). Preferably, an aliphatic or an aromatic hydrocarbon solvent is used, such as benzene, toluene, xlene or higher-boiling aromatics or aromatic thinners. Aliphatic alcohols containing about 3 to about 8 carbon atoms, such as isopropanol, isobutylcarbinol, n-butanol and the like, in combination with hydrocarbon solvents are also suitable for use with the present additives. In the concentrate, the amount of the additive will generally range from about 10 to about 70 weight percent, preferably to about 50 weight percent, more preferably from about 20 to about 40 weight percent.

In gasoline fuels, other fuel additives may be employed with the additives of the present invention, including, for example, oxygenates, such as t-butyl methyl ether, antiknock agents, such as methylcyclopentadienyl manganese tricarbonyl, and other dispersants/detergents, such as hydrocarbyl amines, hydrocarbyl polyalkyl amines, or succinimides. Additionally, antioxidants, metal deactivators and demulsifiers may be present.

In diesel fuels, other well-known additives can be employed, such as pour point depressants, flow improvers, cetane improvers and the like.

A fuel-soluble, nonvolatile carrier fluid or oil may also be used with the polyamine containing polyalkyl aromatic esters of this invention. The carrier fluid is a chemically inert hydrocarbon-soluble liquid vehicle which substantially increases the nonvolatile residue (NVR), or solvent-free liquid fraction of the fuel additive composition while not overwhelmingly contributing to octane requirement increase. The carrier fluid may be a natural or synthetic oil, such as mineral oil, refined petroleum oils, synthetic polyalkanes and alkenes, including hydrogenated and unhydrogenated polyalphaolefins, synthetic polyoxyalkylene-derived oils, such as those described, for example, in U.S. Pat. No. 4,191,537 to Lewis, and polyesters, such as those described, for example, in U.S. Pat. Nos. 3,756,793 and 5,004,478 to Robinson and Vogel et al., respectively, and in European Patent Application Nos. 356,726 and 382,159, published Mar. 7, 1990 and Aug. 16, 1990, respectively.

These carrier fluids are believed to act as a carrier for the fuel additives of the present invention and to assist in removing and retarding deposits. The carrier fluid may also exhibit synergistic deposit control properties when used in combination with a polyamine-containing polyalkyl aromatic ester of this invention.

The carrier fluids are typically employed in amounts ranging from about 100 to about 5,000 ppm by weight of the hydrocarbon fuel, preferably from about 400 to about 3,000 ppm of the fuel. Preferably, the ratio of carrier fluid to deposit control additive will range from about 0.5:1 to about 10:1, more preferably from 1:1 to about 4:1, most preferably about 2:1.

When employed in a fuel concentrate, carrier fluids will generally be present in amounts ranging from about 20 to about 60 weight percent, preferably from about 30 to about 50 weight percent.

EXAMPLES

The following examples are presented to illustrate specific embodiments of the present invention and synthetic preparations thereof; and therefore these examples should not be interpreted as limitations upon the scope of this invention.

Example 1

Preparation of

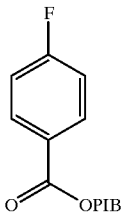

4-Fluorobenzoyl chloride (8.4 grams) was combined with 50.0 grams of polyisobutanol (molecular weight average 984, prepared via hydroformylation of Amoco H-100 polyisobutene) and anhydrous toluene (500 mL). 4-Dimethylamino pyridine (6.7 grams) was then added and the resulting mixture was heated to reflux under nitrogen for 16 hours. The reaction was cooled to room temperature and diluted with 1 liter of hexane. The organic layer was washed twice with saturated aqueous sodium bicarbonate solution and once with brine. The organic layer was dried over anhydrous magnesium sulfate, filtered and the solvents removed in vacuo to yield 54.9 grams of the desired product as a yellow oil.

Example 2 preparation of

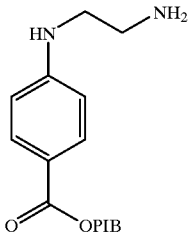

To a flask equipped with a magnetic stirrer, addition funnel, reflux condenser and nitrogen inlet was added ethylenediamine (65.3 mL), toluene (150 mL) and the product from Example 1 (54.9 grams). The mixture was refluxed for thirty-six hours, cooled to room temperature and diluted with 1500 mL of hexane. The organic phase was washed once with saturated aqueous sodium bicarbonate, twice with water, once with brine, dried over anhydrous sodium sulfate, filtered and concentrated in vacuo to yield 27.7 grams as a yellow oil. The oil was chromatographed on silica get, eluting with hexanelethyl acetate (7:3) followed by hexaneldiethyl etherlmethanolfisopropylamine (40:40:15:5) to afford 16.6 grams of the desired product as a yellow oil. $^1$H NMR (CDCl$_3$) d 7.9 (d, 2H), 6.55 (d, 2H), 4.2 (d, 2H), 3.3 (t, 2H), 3.0 (t, 2H), 2.15 (bs, 3H), 0.7–1.6 (m, 137H).

Example 3

Single-Cylinder Engine Test

The test compounds were blended in gasoline and their deposit reducing capacity determined in an ASTMICFR single-cylinder engine test.

Waukesha CFR single-cylinder engine was used. Each run was carried out for 15 hours, at the end of which time the intake valve was removed, washed with hexane and weighed. The previously determined weight of the clean valve was subtracted from the weight of the value at the end of the run. The differences between the two weights is the weight of the deposit. A lesser amount of deposit indicates a superior additive. The operating conditions of the test were as follows: water jacket temperature 200° F.; vacuum of 12 in Hg, air-fuel ratio of 12, ignition spark timing of 400 BTC; engine speed is 1800 rpm; the crankcase oil is a commercial 30W oil.

The amount of carbonaceous deposit in milligrams on the intake valves is reported for each of the test compounds in Table I.

TABLE I

| Sample[1] | Intake Valve Deposit Weight (in milligrams) | | |
|---|---|---|---|
| | Run 1 | Run 2 | Average |
| Base Fuel | 246.4 | 253.1 | 249.8 |
| Example 2 | 2.4 | 5.2 | 3.8 |

[1]At 75 parts per million actives (ppma).

The base fuel employed in the above single-cylinder engine tests was a regular octane unleaded gasoline containing no fuel detergent. The test compounds were admixed with the base fuel to give the concentrations indicated in the tables.

The data in Table I illustrates the significant reduction in intake valve deposits provided by the polyamines of the polyalkyl aromatic esters of the present invention (Example 2) compared to the base fuel.

What is claimed is:

1. A compound of the formula:

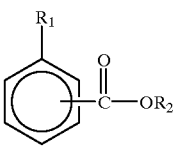

or a fuel-soluble salt thereof;
   wherein $R_1$ is a polyamine moiety having about 2 to about 12 amine nitrogen atoms and about 2 to about 40 carbon atoms, wherein the polyamine moiety is connected to the aromatic ring through one of its amine nitrogen atoms; and
   $R_2$ is a polyalkyl group having an average molecular weight in the range of about 450 to 5,000.

2. The compound according to claim 1, wherein $R_1$ is a polyamine moiety derived from ethylenediamine or diethylenetriamine.

3. The compound according to claim 2, wherein $R_1$ is a polyamine moiety derived from ethylenediamine.

4. The compound according to claim 1, wherein $R_2$ is a polyallyl group having an average molecular weight in the range of about 500 to 5,000.

5. The compound according to claim 4, wherein $R_2$ has an average molecular weight in the range of about 500 to 3,000.

6. The compound according to claim 5, wherein $R_2$ has an average molecular weight in the range of about 600 to 2,000.

7. The compound according to claim 1, wherein $R_2$ is a polyalkl group derived from polypropylene, polybutene, or polyalphaolefin oligomers of 1-octene or 1-decene.

8. The compound according to claim 7, wherein $R_2$ is derived from polyisobutene.

9. The compound according to claim 8, wherein the polyisobutene contains at least about 20% of a methylvinylidene isomer.

10. A fuel composition comprising a major amount of hydrocarbons boiling in the gasoline or diesel range and an effective detergent amount of a compound of the formula:

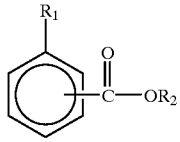

or a fuel-soluble salt thereof;
wherein $R_1$ is a polyamine moiety having about 2 to about 12 amine nitrogen atoms and about 2 to about 40 carbon atoms, wherein the polyamine moiety is connected to the aromatic ring through one of its amine nitrogen atoms; and
$R_2$ is a polyalkyl group having an average molecular weight in the range of about 450 to 5,000.

11. The fuel composition according to claim 10, wherein $R_1$ is a polyamine moiety derived from ethylenediamine or diethylenetriamine.

12. The fuel composition according to claim 11, wherein $R_1$ is a polyamine moiety derived from ethylenediamine.

13. The fuel composition according to claim 10, wherein $R_2$ is a polyalkyl group having an average molecular weight in the range of about 500 to 5,000.

14. The fuel composition according to claim 13, wherein $R_2$ has an average molecular weight in the range of about 500 to 3,000.

15. The fuel composition according to claim 14, wherein $R_2$ has an average molecular weight in the range of about 600 to 2,000.

16. The fuel composition according to claim 10, wherein $R_2$ is a polyalkyl group derived from polypropylene, polybutene, or polyalphaolefin oligomers of 1-octene or 1-decene.

17. The fuel composition according to claim 16, wherein $R_2$ is derived from polyisobutene.

18. The fuel composition according to claim 17, wherein the polyisobutene contains at least about 20% of a methylvinylidene isomer.

19. The fuel composition according to claim 10, wherein said composition contains about 50 to about 2,500 parts per million by weight of said compound.

20. A fuel concentrate comprising an inert stable oleophilic organic solvent boiling in the range of from about 150° F. to 400° F. and from about 10 to about 70 weight percent of a compound of the formula:

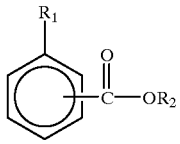

or a fuel-soluble salt thereof;
wherein $R_1$ is a polyamine moiety having about 2 to about 12 amine nitrogen atoms and about 2 to about 40 carbon atoms, wherein the polyamine moiety is connected to the aromatic ring through one of its amine nitrogen atoms; and
$R_2$ is a polyalkyl group having an average molecular weight in the range of about 450 to 5,000.

21. The fuel concentrate according to claim 20, wherein $R_1$ is a polyamine moiety derived from ethylenediamine or diethylenetriamine.

22. The fuel concentrate according to claim 21, wherein $R_1$ is a polyamine moiety derived from ethylenediamine.

23. The fuel concentrate according to claim 20, wherein $R_2$ is a polyalkyl group having an average molecular weight in the range of about 500 to 5,000.

24. The fuel concentrate according to claim 23, wherein $R_2$ has an average molecular weight in the range of about 500 to 3,000.

25. The fuel concentrate according to claim 24, wherein $R_2$ has an average molecular weight in the range of about 600 to 2,000.

26. The fuel concentrate according to claim 20, wherein $R_2$ is a polyallyl group derived from polypropylene, polybutene, or polyalphaolefin oligomers of 1-octene or 1-decene.

27. The fuel concentrate according to claim 26, wherein $R_2$ is derived from polyisobutene.

28. The fuel concentrate according to claim 27, wherein the polyisobutene contains at least about 20% of a methylvinylidene isomer.

* * * * *